J. EBEL.
BEARING INDICATOR.
APPLICATION FILED OCT. 19, 1914.

1,260,996.

Patented Mar. 26, 1918.

WITNESSES

INVENTOR
John Ebel,
BY
ATTORNEY

UNITED STATES PATENT OFFICE.

JOHN EBEL, OF SOMERVILLE, NEW JERSEY, ASSIGNOR TO BOUND BROOK OIL-LESS BEARING COMPANY, OF BOUNDBROOK, NEW JERSEY, A CORPORATION OF NEW JERSEY.

BEARING-INDICATOR.

1,260,996.  Specification of Letters Patent.  Patented Mar. 26, 1918.

Application filed October 19, 1914. Serial No. 867,350.

*To all whom it may concern:*

Be it known that I, JOHN EBEL, a citizen of the United States, and a resident of Somerville, in the county of Somerset and State of New Jersey, have invented certain new and useful Improvements in Bearing-Indicators, of which the following is a full, clear, and exact description, whereby any one skilled in the art may make and use the same.

The invention relates to a bearing indicator which serves both as an advertising medium, and as a useful indicator for insuring proper assembly and use of the parts of a self lubricating bearing. When used merely for advertising purposes, it serves as an instructor, indicating the application of one part to another, and illustrates the method of lubrication. It may be used for any convenient purpose such as a paper weight, if put out simply for advertising purposes, and thus becomes a constant reminder of the method of lubrication employed.

The invention relates more particularly to the providing of a metallic shell having formed or cut therein certain indicia which when the shell is divided in halves and placed end to end, will clearly show an imprinted word.

In selecting the inserted or imprinted word, only such letters are used as will, when the two halves of the bearing are together, produce substantially spirally arranged lines, or grooves with transverse bar portions, which in effect will provide lines of lubrication of graphite or other suitable lubricant which will permit a rotating shaft to carry the lubrication over every portion of the metal.

The object of the invention is to provide in an article of manufacture, a device which may serve the dual purpose of an advertising medium and an indicator for a self lubricating bearing having unusual and most efficient qualities.

Referring to the drawings.

Figure 1:
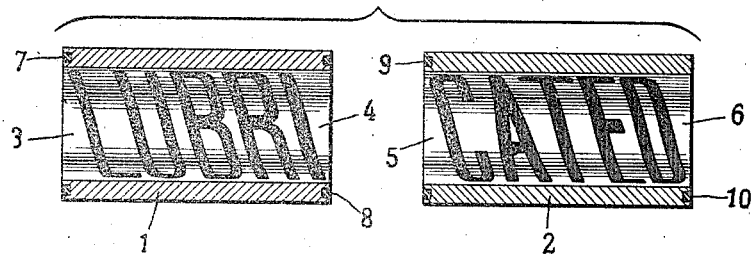
Figure 1 illustrates the two halves of a single piece bearing shell cut in sections with letters arranged therein in the form of lubricating grooves or chambers.

It is not new in the art to provide a self-lubricating bearing or a bearing having grooves for the interior of its shell to hold a lubricant and therefore no claim is made therein broadly to a groove.

The device herein illustrated and described is a bearing indicator which primarily consists of a unique arrangement of metallic parts in which advertising matter may be inserted in the form of inlays or grooves for the purpose of inlaying a graphite material for lubrication, in a form to produce a useful mechanical structure and indicator for proper assembly. After its advertising value has been utilized; it may be employed as a unique form of paper-weight or for any purpose desired. When so used, it is a constant reminder of the method of lubrication employed, and serves to demonstrate the proper assembly of two halves of a bearing to get the efficient lubrication required.

One of the first prerequisites of a self-lubricating bearing, that is, such a bearing as is made of metal with grooves, having inserted therein a lubricating material, is that the grooves be arranged in a substantially spiral form so that the rotating motion will carry the lubricant from the grooves across every portion of the metal. It is also important that there be a maximum of lubricating material arranged in the bearing commensurate with due regard to the strength of the shell.

The invention herein defined relates to the utilization of grooves which when placed in a specific arrangement read as a word. That is, the grooves, when combined, really form letters and the disposition and arrangement of the letters is such that there is a maximum body of metallic strength and ample grooves for the lubricant.

As illustrated in the drawing, the word "lubricated" is used merely for the purposes of illustration and it should be observed that the various letters are arranged transversely to the axis of the metal shell or in what might be termed a "back-hand" type of letter. Obviously, they might just as well be formed in a forward slanting type so long as there is an angular disposition of the main portion of the letters which is transverse to the axis of the metal shell.

The letters, as selected when the two sections of the metal shell shown in Fig. 1 are imposed one upon the other will be transverse to each other so that there is in effect a series of spiral grooves reversing direction at each 180° of a cylindrical bearing.

In the accompanying drawings, the numeral 1 denotes a bearing shell of comparatively thin metal forming one-half of a complete bearing and 2 indicates a similar section. For the purposes of illustration, there is shown in the section 1, the letters L U B R I and in the section 2, C A T E D. These letters are all arranged within the extreme ends 3, 4 and 5 and 6 of the bearing sections 1 and 2 and as illustrated, are of a "back-hand" or slanting type of letter so that the upright lines of each letter form what is in substance a series of spiral grooves extending half way about the bearing, while the cross-bars of the letters extend slightly transverse to the axis of the shell member and substantially at right angles to the main lines of the letters.

Figure 2:
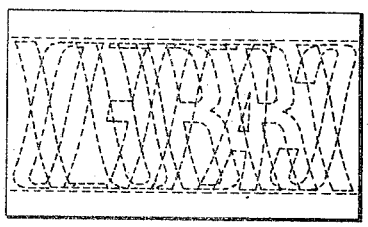
Fig. 2 is a plan view on enlarged scale with the two halves of the bearing in place and with the lettering shown in dotted outline to illustrate the arrangement of the grooves.
Figure 4:
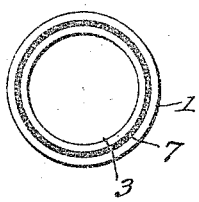
Fig. 4 is an end view of a single piece bearing.
Figure 5:
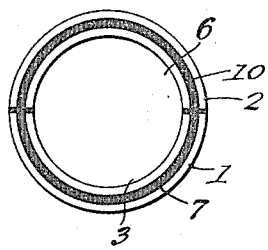
Fig. 5 is an end view of a split bearing.

It will be observed by reference to Fig. 2 of the drawings, due care is exercised in selecting letters which will give complete lubrication; for instance, the letter "D" occupies a position transversely to the letter "L" and the main lines of the letters are transverse to each other, while the loop of the "D" forms a groove which insures transmission of the lubrication; similarly with the letters "E" and "U," "T" and "B," "A" and "R," "C" and "I."

The metallic casing parts 1 and 2 are ordinarily formed of bright metal, such, for instance, as bronze and the grooves indicating the letters are filled with some lubricant or compound, preferably a compound of graphite. This shows clear letter markings of black against the bright metal shell.

Figure 3:
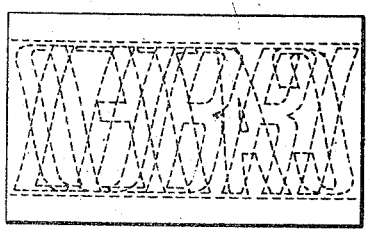
Fig. 3 is a plan view similar to that of Fig. 2 illustrating the letters of a forward slanting type.

When the two parts of the shell are in place, making a complete cylindrical structure, there is no suspicion of a word but when opened up longitudinally and placed end to end, there is immediately disclosed the advertising word which may be of any desired letter-form, so long as letters are selected as above indicated with due regard to their complete and perfect intersection one with the other with regard to the distribution of the lubricant. The word must be divided so that a portion of the letters appear in one half of the bearing, while the remainder of the letters appear in the second half. When the two halves are placed end to end, the complete word is disclosed, and to properly assemble the parts, the two sections must be placed together so that the letters will bear the relation to each other indicated in Figs. 2 and 3. When so placed the proper lubricating effect will be secured.

To draw more particular attention to the device as an advertising structure, the respective ends of the shells may be grooved as at 7, 8, 9, 10, so that there will be a showing of a black band of lubricant at either end of the shell portions. This is also useful when the device is used mechanically.

Ordinarily, the devices are distributed in a complete cylindrical form and when opened, display the advertising word, whatever it may be. Of course, the exterior of the shell may be embellished with suitable inscriptions for advertising purposes.

The value of the device as an advertising structure is apparent. It indicates the unique use of letters forming words interiorly arranged as lubricating grooves in a mechanically useful and substantial bearing. It also serves as an indicator to instruct one in the proper assembly of the parts, and illustrates the spiral arrangement of grooves for giving complete and perfect lubrication.

What I claim as my invention and desire to secure by Letters Patent is:

A bearing having indicator means for denoting correct arrangement of the combined parts thereof, consisting of a metallic shell having interior lubricating grooves, said grooves representing the letters of a complete word and said structure providing a complete bearing, said word having a part of its letters in each half of the bearing, and serving to indicate the proper assembly of the halves of the bearing and contained grooves.

JOHN EBEL.

Witnesses:
 FRED H. BACHE,
 GEO. S. SMALLEY.

Copies of this patent may be obtained for five cents each, by addressing the "Commissioner of Patents, Washington, D. C."